United States Patent
Milanesi

(10) Patent No.: US 11,802,602 B2
(45) Date of Patent: Oct. 31, 2023

(54) DISC ASSEMBLY OF DISC BRAKE

(71) Applicant: BREMBO S.p.A., Curno (IT)

(72) Inventor: Andrea Milanesi, Curno (IT)

(73) Assignee: Brembo S.p.A., Bergamo (IT)

( * ) Notice: Subject to any disclaimer, the term of this patent is extended or adjusted under 35 U.S.C. 154(b) by 320 days.

(21) Appl. No.: 17/415,820

(22) PCT Filed: Dec. 19, 2019

(86) PCT No.: PCT/IB2019/061117
§ 371 (c)(1),
(2) Date: Jun. 18, 2021

(87) PCT Pub. No.: WO2020/128963
PCT Pub. Date: Jun. 25, 2020

(65) Prior Publication Data
US 2022/0136579 A1 May 5, 2022

(30) Foreign Application Priority Data

Dec. 20, 2018 (IT) .......................... 102018000020464

(51) Int. Cl.
*F16D 65/12* (2006.01)
*F16D 65/02* (2006.01)

(52) U.S. Cl.
CPC .......... *F16D 65/123* (2013.01); *F16D 65/125* (2013.01); *F16D 2065/1316* (2013.01);
(Continued)

(58) Field of Classification Search
CPC ..... F16D 65/123–128; F16D 2065/136; F16D 2065/1316; F16D 2065/1348;
(Continued)

(56) References Cited

U.S. PATENT DOCUMENTS

| | | | |
|---|---|---|---|
| 6,247,562 B1 | 6/2001 | Gotti et al. | |
| 6,446,765 B1 | 9/2002 | Dabertrand et al. | |
| 7,104,368 B2 | 9/2006 | Cornolti et al. | |
| 7,568,560 B2 * | 8/2009 | Lin | F16D 65/12 188/218 XL |
| 7,861,832 B2 * | 1/2011 | Kleber | F16D 65/12 188/218 XL |

FOREIGN PATENT DOCUMENTS

| | | | | |
|---|---|---|---|---|
| DE | 3605806 A1 * | 9/1987 | | B60T 1/06 |
| EP | 0127932 A1 | 12/1984 | | |

(Continued)

OTHER PUBLICATIONS

European Patent Office, International Search Report with Written Opinion, issued in PCT/IB2019/061117, dated May 27, 2020, 11 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A disc assembly has a braking band, a bell and at least one driving element. The bell has at least one driving surface, forming a tangential abutment surface. The bell rests on at least one surface of the braking band or on a plurality of surfaces of the braking band coplanar with one another. The braking band has at least one driving band surface extending along axial and radial directions, forming at least one tangential abutment surface and slidingly rests on the at least one driving band surface. The driving element is selectively movable from a position in which it avoids resting on the bell to a position in which it rests on the bell and constrains the bell to the braking band in axial and circumferential directions, preventing the braking band from being constrained to the bell in radial direction.

22 Claims, 9 Drawing Sheets

(52) U.S. Cl.
CPC ......... *F16D 2065/1348* (2013.01); *F16D 2065/1392* (2013.01); *F16D 2200/003* (2013.01); *F16D 2200/0021* (2013.01); *F16D 2250/0084* (2013.01)

(58) Field of Classification Search
CPC ....... F16D 2065/1392; F16D 2200/003; F16D 2200/0021; F16D 2200/0052; F16D 2250/0084
USPC .................................................. 188/218 XL
See application file for complete search history.

(56) References Cited

FOREIGN PATENT DOCUMENTS

| | | | |
|---|---|---|---|
| EP | 0987462 | A1 | 3/2000 |
| EP | 1091137 | A1 | 4/2001 |
| EP | 1798438 | A1 | 6/2007 |
| EP | 1466106 | B1 | 7/2008 |
| EP | 2740961 | A1 | 6/2014 |
| WO | WO 02/01088 | A1 | 1/2002 |
| WO | WO 02/38979 | A1 | 5/2002 |
| WO | WO 03/089802 | A1 | 10/2003 |
| WO | WO-2019239240 | A1 * | 12/2019 ........... F16D 65/123 |

\* cited by examiner

DISC ASSEMBLY OF DISC BRAKE

CROSS-REFERENCE TO RELATED APPLICATIONS

This application is a National Phase Application of PCT International Application No. PCT/IB2019/061117, having an International Filing Date of Dec. 19, 2019, which claims priority to Italian Application No. 102018000020464 filed Dec. 20, 2018, each of which is hereby incorporated by reference in its entirety.

FIELD OF THE INVENTION

In its more general aspect, the present invention relates to a disc assembly of disc brake which combines particular lightness and structural simplicity with high resistance to wear and to thermo-mechanical stress.

According to a particular embodiment, the present invention relates to an assembly comprising a bell adapted to be associated with a braking band, e.g. a ventilated type band, to form a disc for disc brake comprising a braking band capable of high cooling efficiency together with high resistance to wear and to thermo-mechanical stress.

In particular, the present invention relates to a disc comprising a bell with a rotation axis X-X and a braking band associated therewith. Band and bell are manufactured in separate pieces and connected to each other by axial constraints A-A and tangential constraints T-T if considered locally, or circumferential constraints C-C if considered as a whole.

In other words, the present invention relates to a braking band assembly connected to a bell to form a disc capable of rotating around a rotation axis X-X either coincident with or parallel to an axial direction A-A. This assembly extends away from said rotation axis along radial directions R-R which are orthogonal to said axial direction A-A and along circumferential directions C-C, which are orthogonal to said axial direction A-A and to said radial directions R-R, and locally defining tangential directions T-T duly orthogonal to said axial direction A-A and orthogonal to the radial direction R-R passing through said point.

BACKGROUND ART

It is known that the braking devices commonly used in motor vehicles comprise a metal disc, fixed to the wheel hub, straddling on which a brake caliper acts, which brake caliper is fixed to the stub axle or to the hub holder of the vehicle and provided with friction linings.

In particular, the disc comprises a braking band, provided with at least one braking surface, commonly two opposite braking surfaces, and a bell fixed to the wheel hub.

The calipers, hydraulically actuated by means of cylinder/piston assemblies, press the pads against the braking surfaces of the braking band. The braking action is, therefore, produced by the friction between the pads and the braking surface of the brake disc.

The friction of the pads against the braking band of the disc determines the dissipation of the kinetic energy of the masses to be braked into heat, which produces the increase in disc temperature, particularly high at the braking surface.

For this reason, the braking band must have high cooling efficiency and be particularly resistant both to wear produced by the abrasive action of the pads and to temperatures.

Instead, such wear resistance properties are not required for the bell, for which it is advantageous to use a material which allows to achieve a complex geometry with high mechanical properties.

For the aforesaid reasons, it is known, above all in high-performance braking devices, to make the disc in two parts, i.e. the braking band made of temperature- and wear-resistant material, and the bell made of a material with the above-mentioned mechanical properties.

The materials commonly used for making the braking band are materials such as cast irons or similar alloys, which are characterized by high wear resistance, high hardness and at the same time brittleness, but sensitive to deformation upon temperature changes.

Differently, the materials commonly used for the bell are metallic materials such as steel, anodized aluminum alloys or similar.

In order to take the different thermal expansion of the materials and the brittleness of the braking band into account, the bell and the braking band are often coupled by means of a joint with tangential and axial constraints and without any radial constraints so as to allow the different radial expansions of the two pieces due to temperature and prevent cracks or fissures in the braking band material.

In particular, the tangential constraint of the aforesaid coupling, which is indispensable for transmitting the braking torque, is performed by means of a toothed coupling between the radial teeth provided along the outer surface of the bell and the corresponding radial teeth provided along the inner surface of the braking band.

A tangential constraint achieved by a toothed coupling between the teeth of the bell and those of the band is described, for example, in WO02/01088 or EP1091137.

Other solutions are known from EP1798438A1, WO03089802A1, EP1466106, WO0238979 and EP0127932.

The known couplings between the bell and the band adapted to constrain them tangentially and axially are often intrinsically complex and also imply a structural and construction complexity, above all of the bell. The complexity of the bell structure implies a considerable weight of the bell and is evidently a major drawback of bells and discs of the prior art.

In addition to the aforesaid drawback related to the high weight of the structure, there is also the problem of cooling efficiency, which in the case of a braking band coupled in a complex manner to the bell is relatively low and not optimal, above all because of the excessive invasiveness of these known couplings.

Furthermore, the need is therefore particularly felt to reduce the assembly components of the bell to the braking band and at the same time to simplify the assembly of the bell to the braking band.

In addition, there is an increasing need in vehicles to accommodate increasingly bulky devices inside the wheel rims, as well as to reduce the axial space available for the disc brake disc.

Therefore, there is an increasing need to reduce the axial dimensions of the disc and in particular the depth of the bell.

At the same time, the need is strongly felt to maintain and also increase the cooling efficiency of a disc obtained by assembling a bell and a band made separately and of two different materials as previously described.

In discs for disc brakes made from a bell and a braking band in one piece, the problem of optimum cooling efficiency is solved by adopting a so-called ventilated braking band.

Unfortunately, the adoption of such a configuration for the braking band of a disc in two pieces is rendered ineffective by the known couplings between band and bell which, by their very nature, particularly concern the air inlet area in the ventilation channels of the band. In other words, in known solutions, in order to connect to the braking band, the bell occupies the lower edge of the braking band thus either blocking or significantly reducing the free access of cooling air into the ventilation channel of the ventilated braking band.

SUMMARY

Therefore, it is the object of the present invention to make available a braking band and a bell having structural and functional characteristics such as to satisfy the aforementioned requirements and to overcome the drawbacks previously mentioned with reference to the discs of the prior art.

These and other objects are achieved by a disc brake disc and an assembly method of disc brake disc as described and claimed herein.

Some advantageous embodiments are the object of the dependent claims.

By virtue of the suggested assembly, it is possible to solve the problems of the prior art and to satisfy the present needs, as well as to simplify the connection between the braking band and the bell and at the same time to reduce the coupling components and to speed up the assembly operations of the band to the bell, while ensuring greater connection accuracy and operating safety.

Furthermore, by virtue of the suggested solution, it is possible to reduce the overall dimensions of the assembly, particularly in axial direction A-A, thus reducing the depth and therefore also the weight of the bell.

DRAWINGS

Further features and advantages of the invention will become apparent from the description provided below of preferred embodiments thereof, given by way of non-limiting examples, with reference to the accompanying drawings, in which.

DESCRIPTION OF SOME PREFERRED EMBODIMENTS

Figure 1:
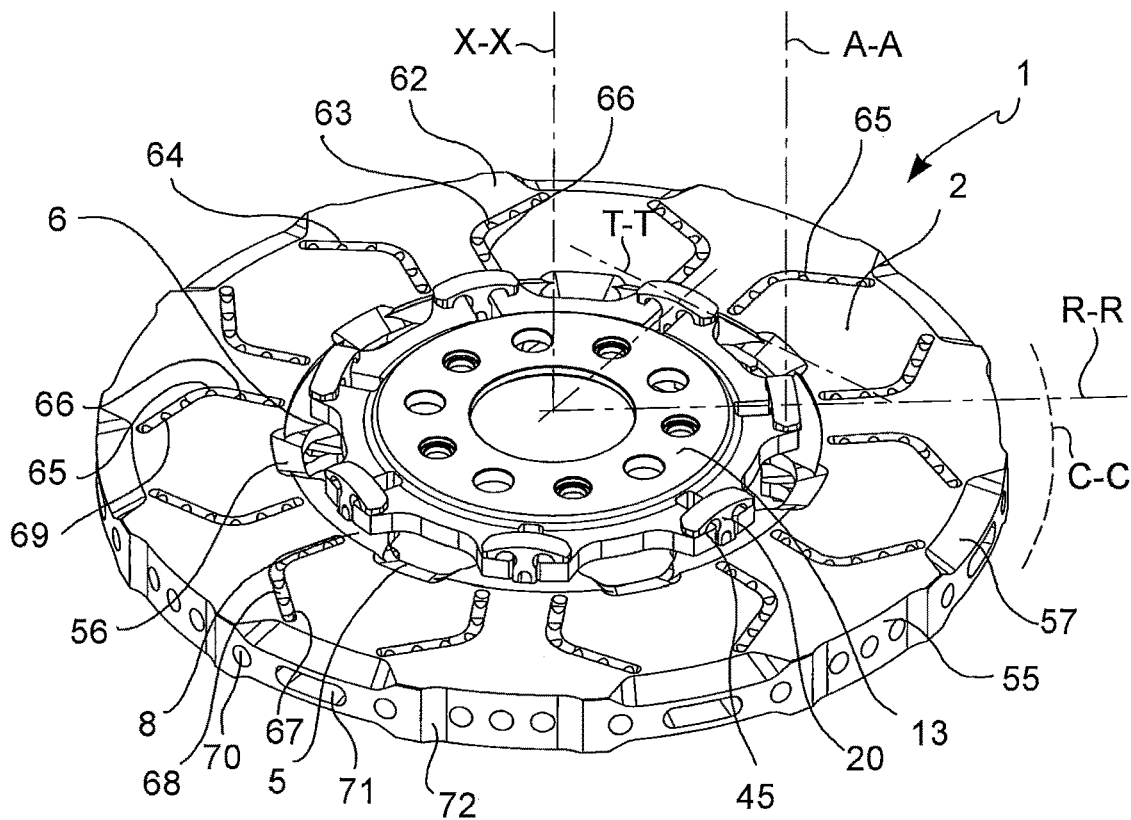
FIG. 1 shows a wheel-side axonometric view of a disc assembly according to the invention.
Figure 2:
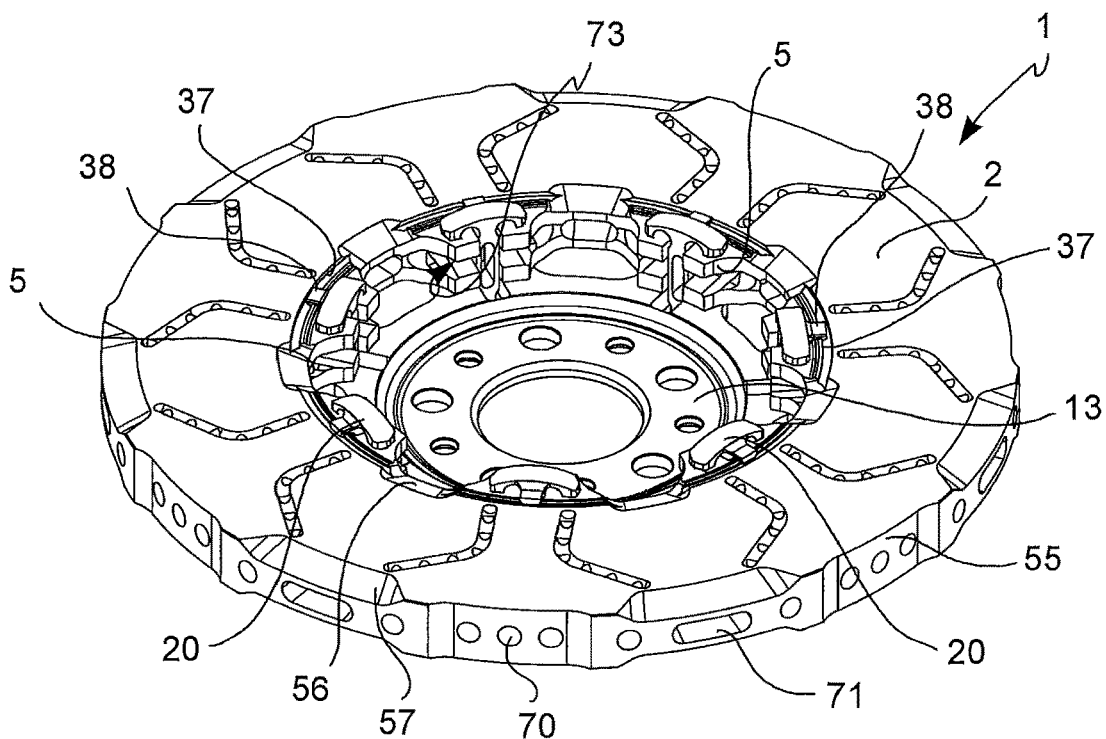
FIG. 2 shows a vehicle-side axonometric view of the assembly in FIG. 1.
Figure 3:
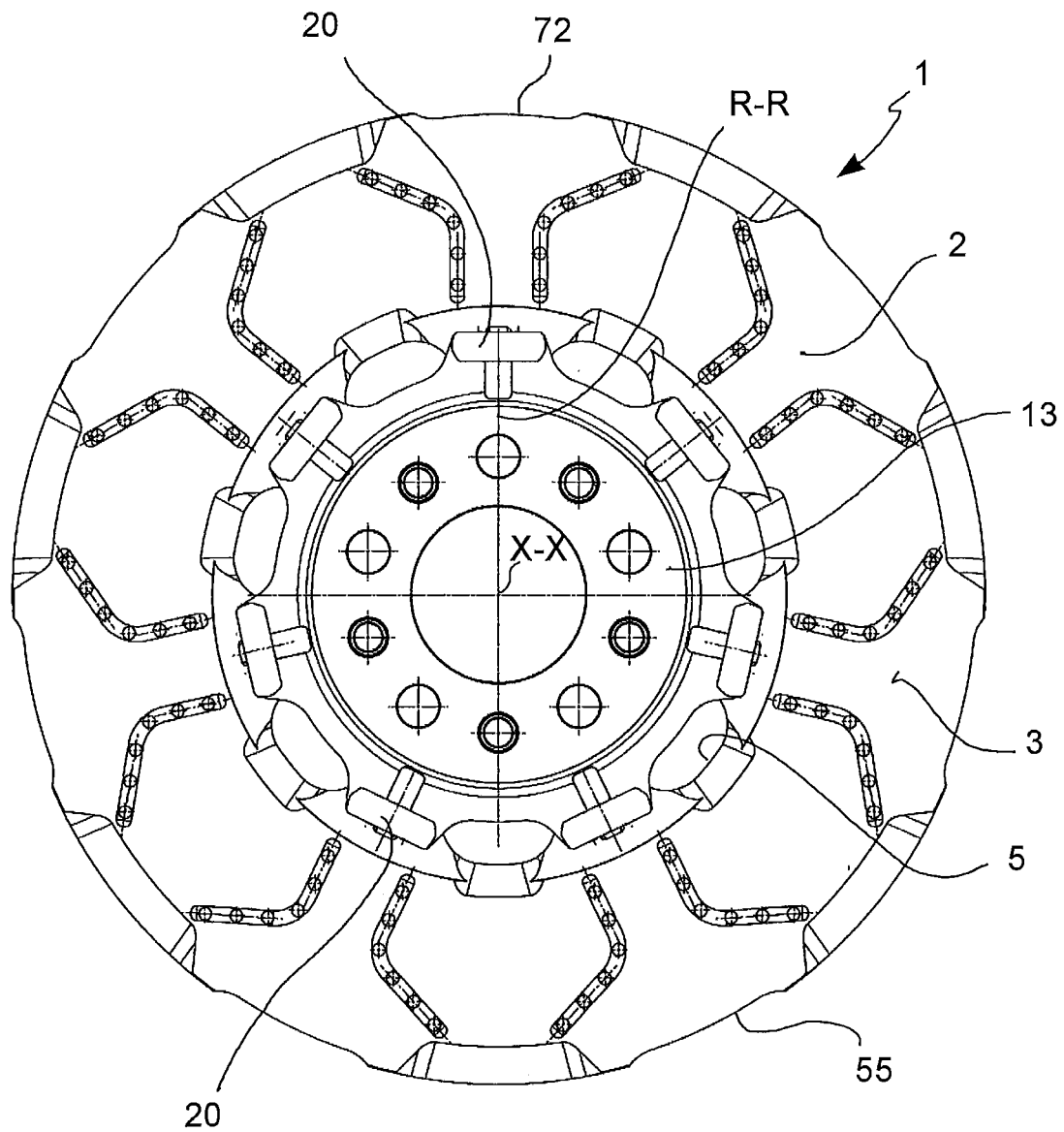
FIG. 3 shows a wheel-side front view of the assembly in FIG. 1.
Figure 4:
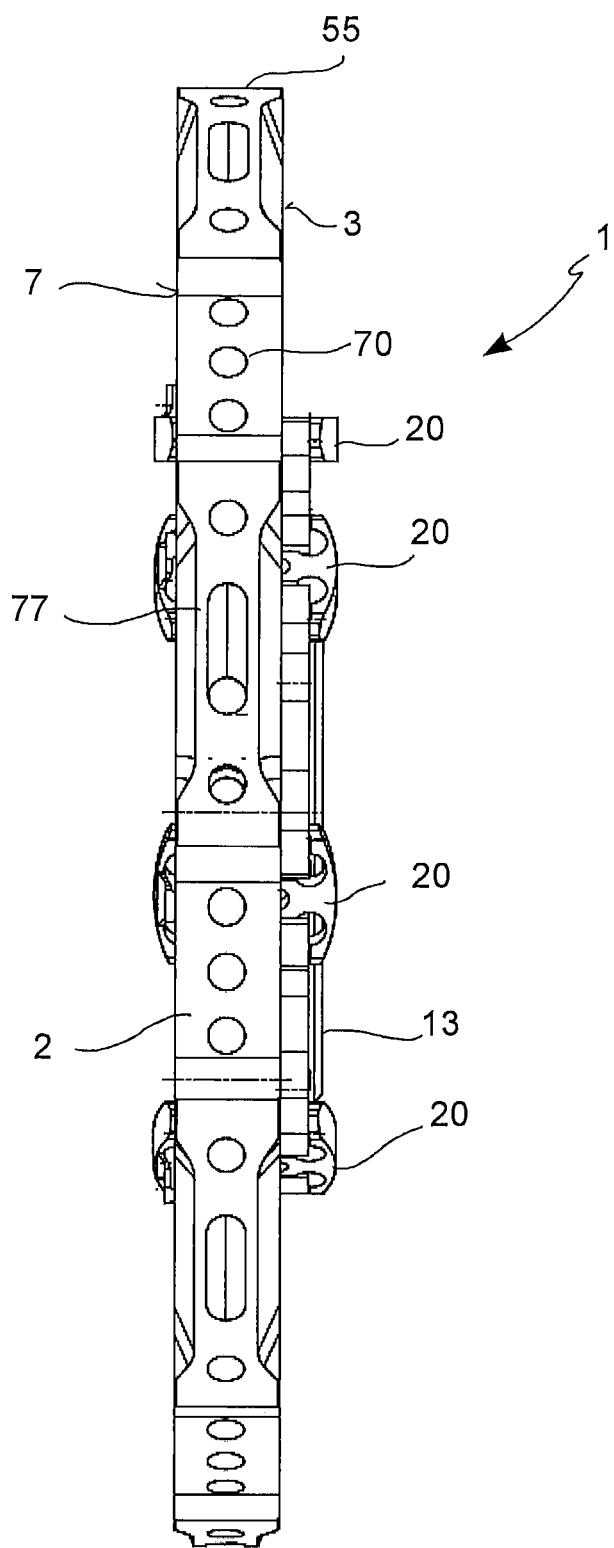
FIG. 4 shows a side view of the assembly in FIG. 1.
Figure 5:
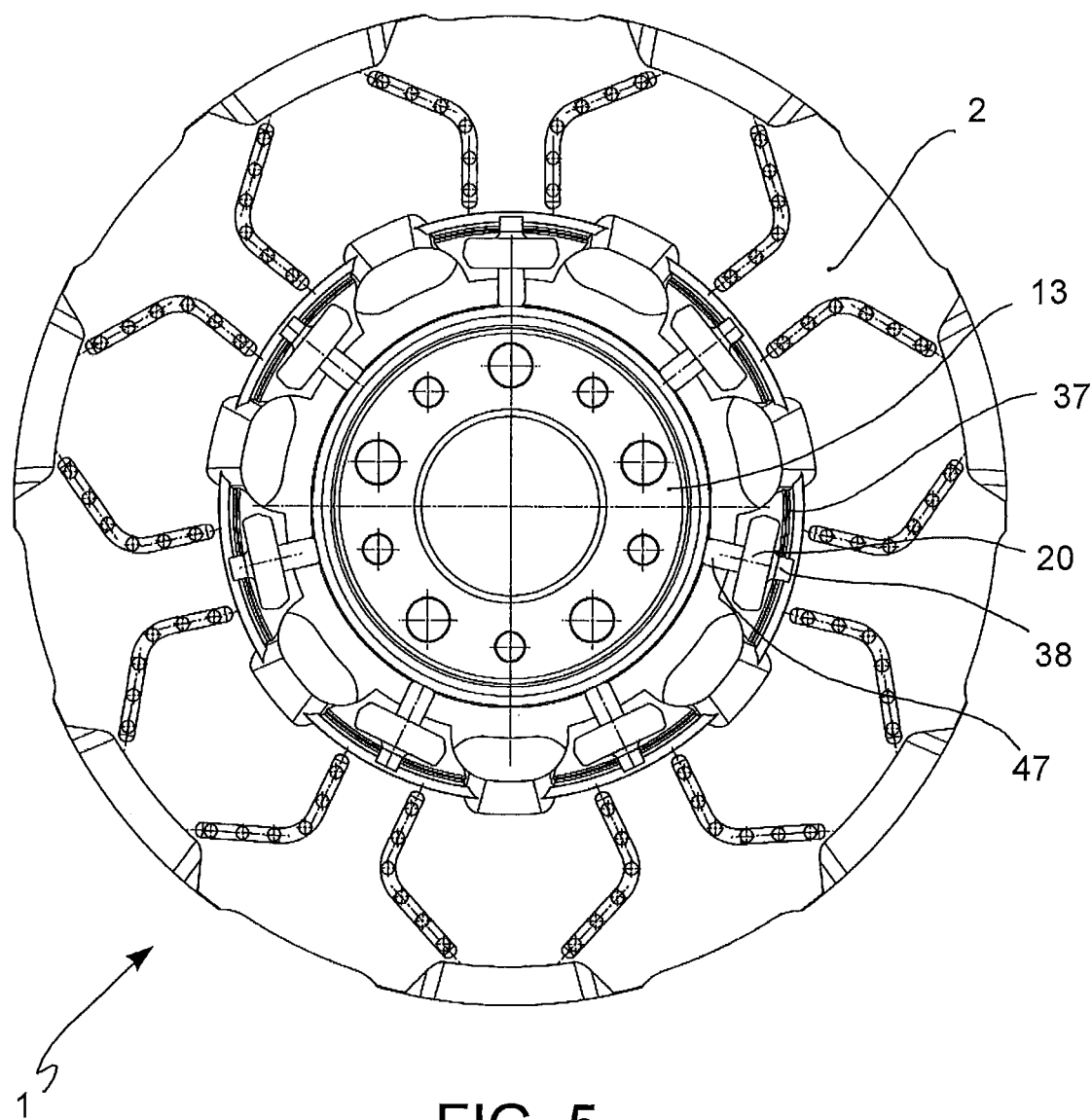
FIG. 5 shows a wheel-side front view of the assembly in FIG. 1.
Figure 6:
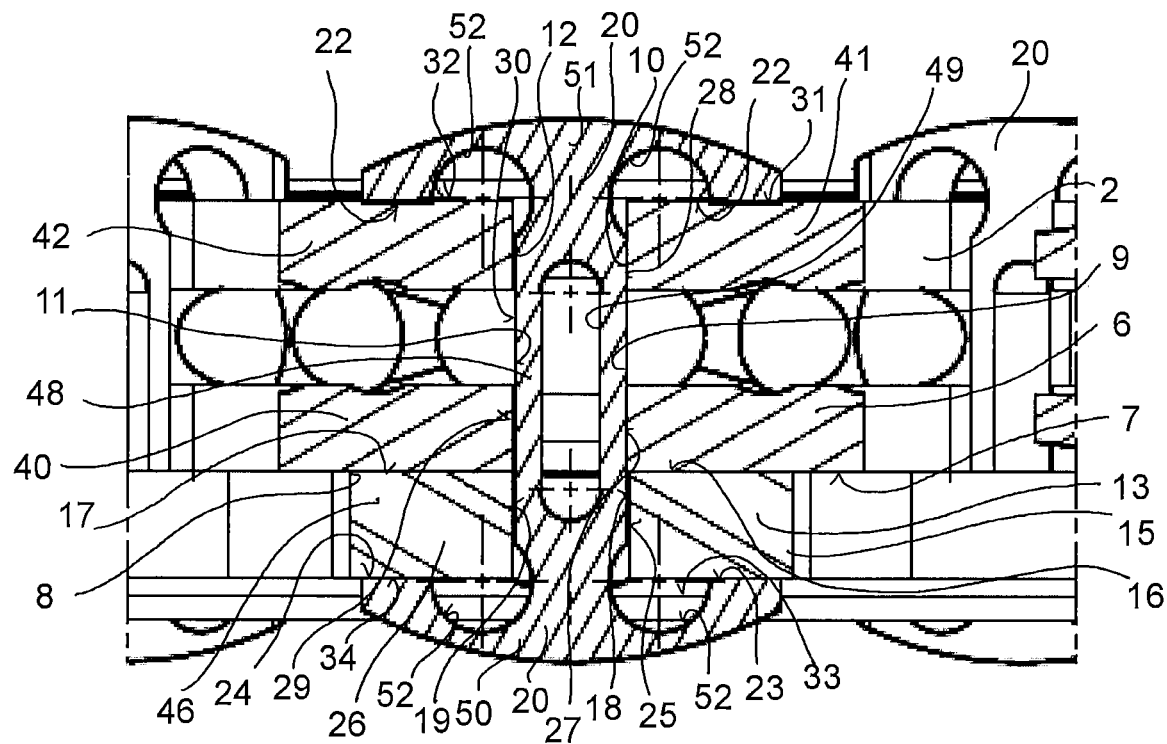
FIG. 6 shows a section view taken along an axial-tangential plane of a detail of a disc assembly which highlights the coupling between braking band and bell.
Figure 7:
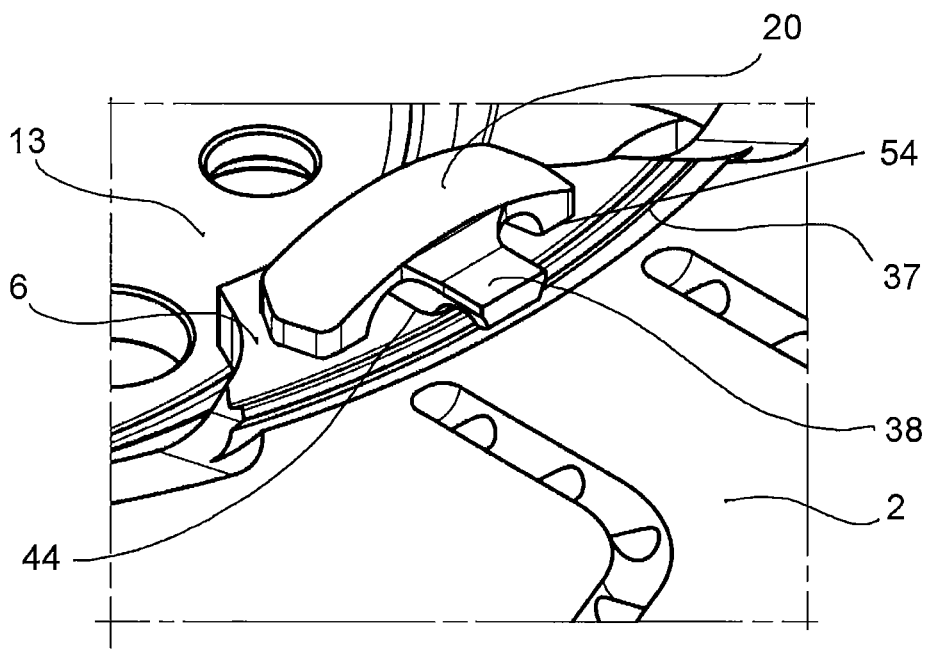
FIG. 7 shows an enlargement of FIG. 2 at one of the band connecting elements.
Figure 8:
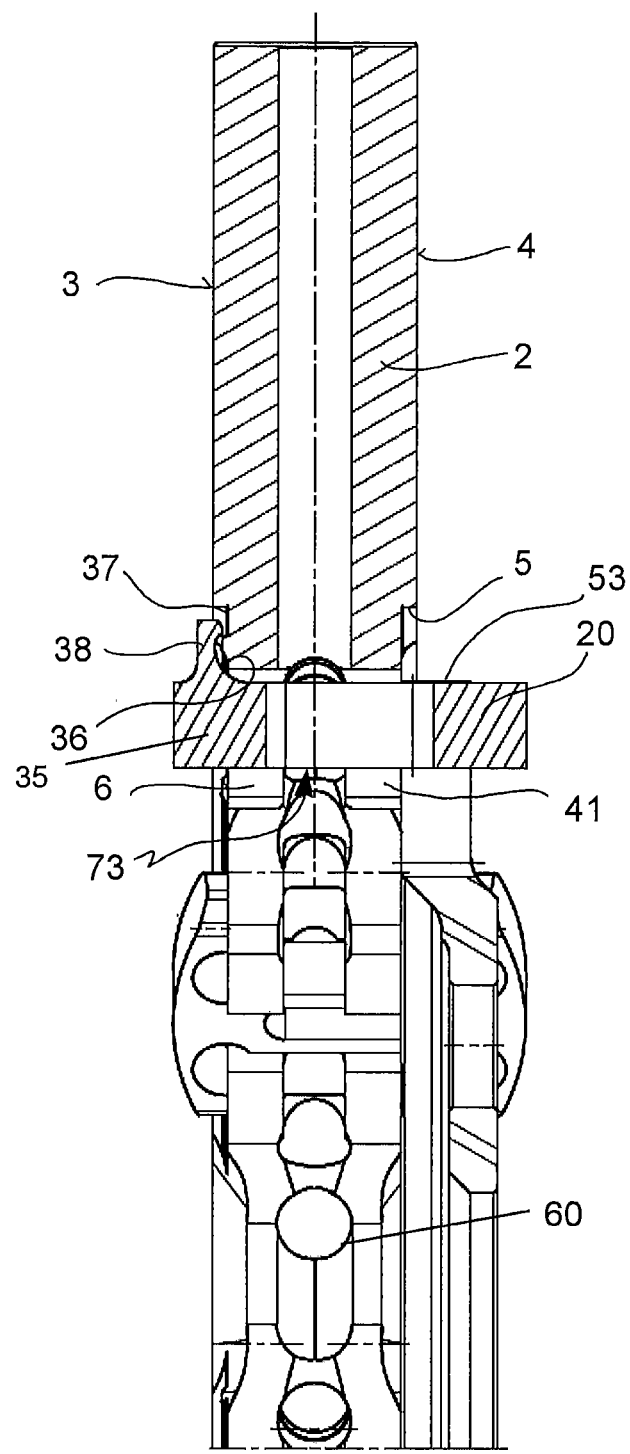
FIG. 8 shows a section view taken along an axial-radial plane of a detail of a disc assembly which highlights the coupling between braking band and bell and the reduced axial dimension of the latter.
Figure 9:
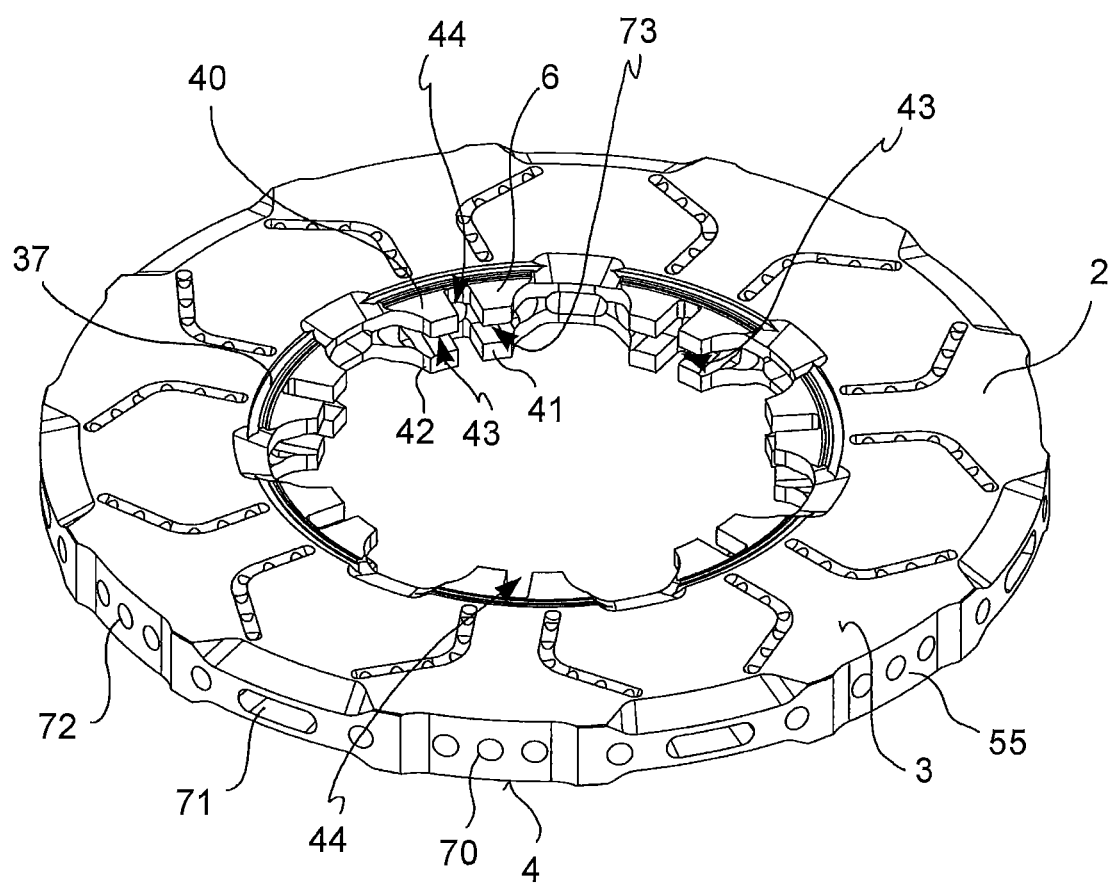
FIG. 9 shows an axonometric view of the braking band only of the assembly in FIG. 1.
Figure 10:
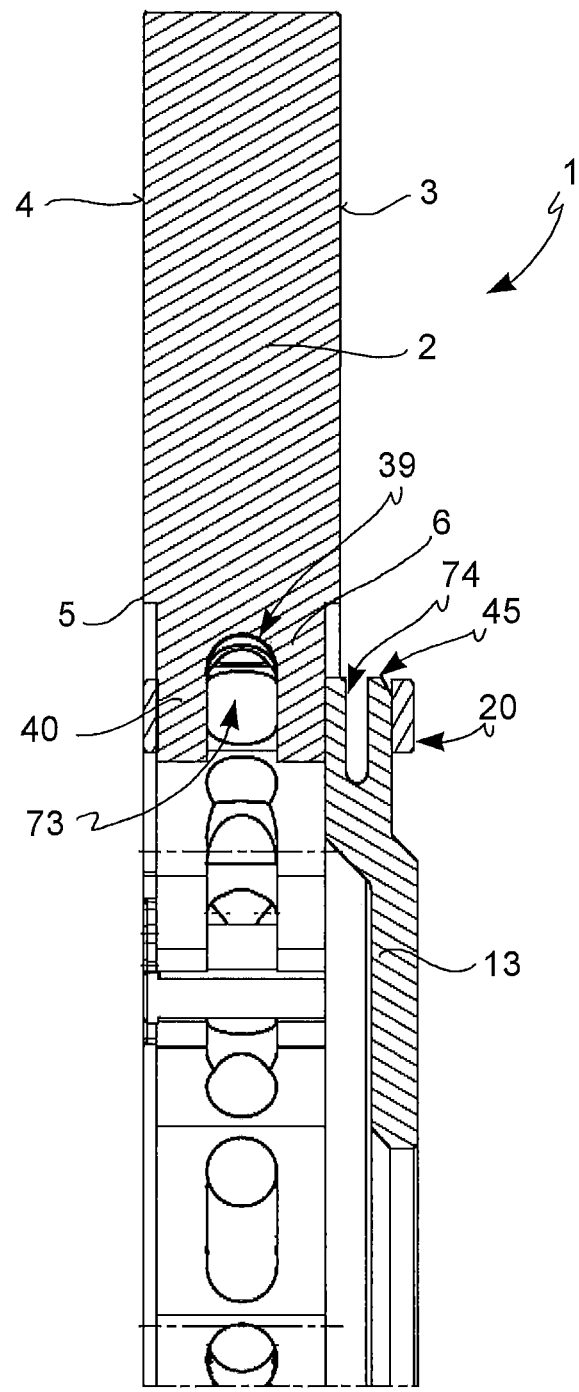
FIG. 10 shows a section view taken along an axial-radial plane of a detail of a disc assembly which highlights the coupling between braking band and bell according to a further embodiment.
Figure 11:
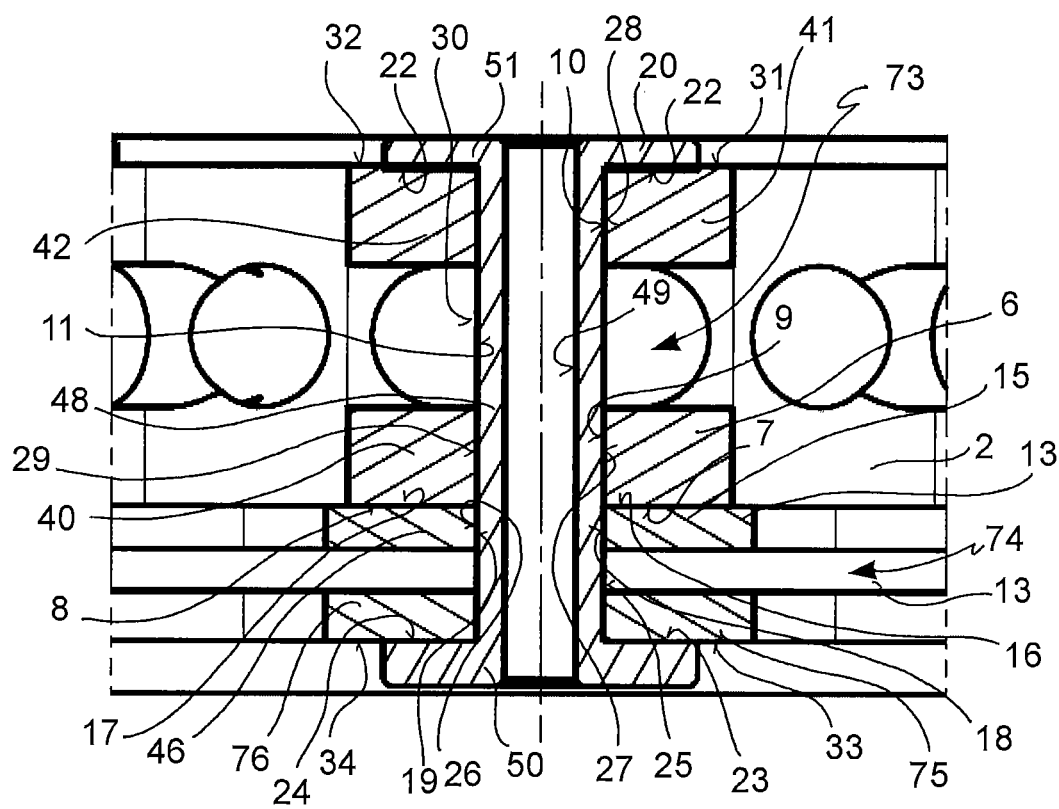
FIG. 11 shows a section view taken along an axial-tangential plane of the detail of a disc assembly which highlights the coupling between braking band and bell of FIG. 10.

The term "bilateral constraint" means a support on opposite surfaces creating a constraint in the same direction but with opposite orientations of reaction.

The term "avoiding a bilateral constraint" means that a component rests on a surface of a second component applying an action only in one orientation of a direction, but remaining free, unless it is subject to other constraints of other components, to raise from said surface along said direction and in the opposite orientation.

The term "avoid constraining in radial direction" does not mean that there is no resistance to the radial movement R-R but rather that it is not entirely prevented. For example, a brake band 2 may be connected to a brake band 13 by means of a connecting force directed in axial direction A-A which creates a friction between the contact surfaces of the brake band 2 and of the bell 13; the friction creates a deformation resistance in radial direction of band 2 which if, e.g. when biased by a temperature rise other than that of brake band 13, tends to expand more than brake band 13, thereby moving away from brake band 13. This friction counteracts the radial deformation of the braking band 2 but does not prevent it, thus falling within this definition.

The term "gasket effect", the name of which derives from the application of pressure vessels, characterized by the presence of a gasket which is much more yielding than the parts subject to compression, means the effect which appears in all connections in which there are stretched elements and compressed elements (connected elements or portions of the ones actually subject to compression). Taking into account the rigidity of the various components, the gasket effect is fundamental to determine in which proportion the forces applied to the connection respectively determine an additional loading of the stretched elements and a relieving of the compressed ones. As for the preload, the tensile forces external to the connection and acting on the connection itself tend to stretch the tensile component and relax the compressed component. By appropriately selecting the yielding of the components or their elasticity, it is possible to predefine the increase of force on the tensioned component and to decrease in force on the compressed component. Since the clamping force of tightened components decreases with the application of an external tensile force, the action on the tensioned component increases only by the difference between the tensile force and the compressive force. Therefore, under operating conditions, only the residual force acts on the separation surface between the components and this is the one which must guarantee the coupling. The main advantage is that it will be more difficult to achieve the detachment between the surfaces of the components, thus guaranteeing a continuous contact and a greater uniformity in the behavior of the connection subject to vibration.

According to a general embodiment, a disc assembly 1 of disc brake is adapted to cooperate with a brake caliper to apply a braking action on a vehicle.

Said assembly is adapted to rotate about a rotation axis X-X either coinciding with or parallel to an axial direction A-A. Said assembly develops away from said rotation axis along radial directions R-R which are orthogonal to said axial direction A-A and along circumferential directions C-C which are orthogonal to said axial direction A-A and to said radial directions R-R, and locally defines tangential directions T-T, which are duly orthogonal to said axial direction A-A and orthogonal to the radial direction R-R passing through said point.

Said assembly comprises a braking band 2.

Said assembly comprises a bell 13 for connecting the disc assembly 1 to a support of a vehicle.

Said assembly comprises at least one driving element 20.

Said bell 13 comprises at least one driving bell surface 18; 19 which extends in a plane comprising said axial A-A and radial R-R directions, thus forming a tangential abutment surface for the bell 13.

Said bell 13 rests on at least one surface 7, 8 of the braking band 2, or a plurality of surfaces 7, 8 of the braking band 2 substantially coplanar with one another, thus avoiding a bilateral constraint at least between said bell and said braking band 2.

Said braking band 2 comprises at least one driving band surface 9; 10; 11; 12 which extends in a plane comprising said axial A-A and radial R-R directions, thus forming at least one tangential abutment surface for the band 2.

Said at least one driving element 20 slidingly rests on said at least one driving bell surface 18; 19.

Said at least one driving element 20 is selectively movable along said at least one driving bell surface 18; 19, passing at least:
from a position in which it avoids resting on the band 2;
to a position in which it rests on the band and constrains said band 2 to said bell 13 in axial direction A-A and in circumferential direction C-C;
thus avoiding said braking band 2 from being constrained to said bell 13 in radial direction R-R.

Advantageously, said band 2 comprises a band edge 36 which forms an outer radial abutment band seat 37 which prevents a movement in radial direction R-R of said driving element 20.

Said at least one driving element 20 comprises at least one radial driving element extension 35.

Said radial driving element extension 35 comprises a coupling tooth 38 which is at least partially and removably inserted into said outer radial abutment band seat 37.

According to an embodiment, said braking band 2 comprises opposite braking surfaces 3, 4 adapted to cooperate with brake pads to apply said braking action.

According to an embodiment, said braking band comprises at least one radial band connecting extension 6 which substantially protrudes in radial direction R-R towards said rotation axis X-X.

According to an embodiment, said at least one radial band connecting extension 6 comprises at least one bell resting surface 7; 8 which extends in a plane comprising said circumferential C-C and radial R-R directions, thus forming an axial abutment surface for a bell 13.

According to an embodiment, said at least one radial band connecting extension 6 comprises at least one driving band surface 9; 10; 11; 12 which extends in a plane comprising said axial A-A and radial R-R directions, thus forming a tangential abutment surface for the band 2.

According to an embodiment, said at least one radial band connecting extension 6 comprises at least a first opposite axial band surface 31; 32 which extends along said circumferential C-C and radial R-R directions, thus forming an axial abutment surface.

According to an embodiment, said braking band 2 comprises a plurality of band connecting elements 39.

According to an embodiment, each band connecting element 39 comprises
said radial band connecting extension, or first radial band connecting extension 6,
a second radial band connecting extension 40,
a third radial band connecting extension 41,
a fourth radial band connecting extension 42.

Said first, second, third and fourth radial band connecting extensions 6, 40, 41, 42 surround said driving element 20 for each band connecting element 39, thus creating bilateral constraints in tangential direction T-T.

According to an embodiment, each band connecting element 39 has four radial band connecting extensions 6, 40, 41, 42 opposed in pairs and separated by a circumferential channel 43 of band connecting element and a radial-axial band window 44 adapted to slidingly accommodate said driving element 20.

According to an embodiment, said band connecting element 39 comprises a channel extending in radial R-R and axial A-A directions between radial band extension portions thereof, which allows said band connecting element 39 to be elastically deformed in the tangential direction T-T of said band connecting element 39, if biased.

According to an embodiment, said band connecting element 39 comprises a channel extending in radial R-R and circumferential C-C directions between radial band extension portions thereof, which allows said band connecting element 39 to be elastically deformed in the axial direction A-A of said band connecting element 39, if biased.

According to an embodiment, said first opposite axial band surface 31 and said second opposite axial band surface 32 arranged on the same plane as said first opposite axial band surface 31 and said first bell resting surface 7 and said second bell resting surface 8 arranged on the same plane as said first bell resting surface 7 are present on portions of the radial band connecting extensions 6, 40, 41, 42 which are separated from one another by at least one circumferential band channel 73 which allows the elastic deformation of the band connecting element 39, thus allowing a preloaded coupling to the driving element 20, thus obtaining the benefits of the gasket effect in case of vibrations of the disc, which reduces knocks and noises and ensures constant sealing and friction on the sliding surfaces between driving element 20 and braking band 2 and bell 13, thus always ensuring an expansion of the band under the optimal conditions set forth in the design.

According to an embodiment, said first band resting surface 16 and second band resting surface 17 arranged on the same plane as said first band resting surface 16 and said first opposite axial bell surface 33 and said second opposite axial bell surface 34 arranged on the same plane as said first opposite axial bell surface 33 are present on portions of radial bell connecting extensions 15, 46; 75, 76 which are separated from one another by at least one circumferential bell channel 74 which allows the elastic deformation of the bell connecting element 45, thus allowing a preloaded coupling to the driving element 20, thus obtaining the benefits of the gasket effect in case of vibrations of the disc, which reduces knocks and noises and ensures constant sealing and friction on the sliding surfaces between driving element 20 and braking band 2 and bell 13, thus always ensuring an expansion of the band and/or bell under the optimal conditions set forth in the design.

According to an embodiment, said bell 13 comprises a plurality of bell connecting elements 45.

According to an embodiment, each bell connecting element 45 comprises said radial bell connecting extension, or first radial bell connecting extension 15,
a second radial bell connecting extension 46.

Said first and second radial bell connecting extensions 15, 46 for each bell connecting element 45 surround said driving element 20, thus creating bilateral constraints in tangential direction T-T.

According to an embodiment, each bell connecting element 45 has two opposed radial bell connecting extensions 15, 46 separated by a radial-axial bell window 47 adapted to slidingly accommodate said driving element 20.

According to an embodiment, said braking band comprises at least one radial band connecting extension 6 which substantially protrudes in radial direction R-R towards said rotation axis X-X.

According to an embodiment, said at least one radial band connecting extension 6 comprises at least one bell resting surface 7; 8 which extends along said circumferential C-C and radial R-R directions, thus forming an axial abutment surface for a bell 13.

According to an embodiment, said at least one radial band connecting extension 6 comprises at least one driving band surface 9; 10; 11; 12 which extends along said axial A-A and radial R-R directions, thus forming a tangential abutment surface for the band 2.

According to an embodiment, said at least one radial band connecting extension 6 comprises at least a first opposite axial band surface 31; 32 which extends along said circumferential C-C and radial R-R directions, thus forming an axial abutment surface.

According to an embodiment, said at least one bell resting surface 7; 8 consists of two bell resting surfaces 7 and 8 and said two bell resting surfaces 7 and 8 are coplanar and facing the same side as the braking band 2.

According to an embodiment, said two bell resting surfaces 7 and 8 are formed on two adjacent but separate radial band connecting extensions 6, 40.

According to an embodiment, said at least one driving band surface 9; 10; 11; 12 are four driving band surfaces 9 and 10 and 11 and 12.

According to an embodiment, said four driving band surfaces 9 and 10 and 11 and 12 are coplanar in pairs 9, 10 and 11, 12 and opposite in pairs 9, 11 and 10, 12, thus forming resting and sliding guides for said driving element 20.

According to an embodiment, said four driving band surfaces 9 and 10 and 11 and 12 are formed in four adjacent but separate radial band connecting extensions 6, 40, 41, 42.

According to an embodiment, said bell 13 comprises at least one radial bell connecting extension 15 which substantially protrudes in radial direction R-R away from said rotation axis A-A.

According to an embodiment, said at least one radial bell connecting extension 15 comprises at least one band resting surface 16; 17 which extends along said circumferential C-C and radial R-R directions, thus forming an axial abutment surface for said braking band 2.

According to an embodiment, said at least one radial bell connecting extension 15 comprises at least one driving bell surface 18; 19 which extends along said axial A-A and radial R-R directions, thus forming a tangential abutment surface for the bell 13.

According to an embodiment, said at least one radial bell connecting extension 15 comprises at least a first opposite axial bell surface 33; 34 which extends along said circumferential C-C and radial R-R directions, thus forming an axial abutment surface.

According to an embodiment, said at least one driving bell surface 18; 19 consists of driving bell surfaces 18 and 19, which are opposed to form a bilateral guide for said driving element 20.

According to an embodiment, said two driving bell surfaces 18 and 19 are formed in two separate radial bell connecting extensions 15, 46.

According to an embodiment, said driving element 20 is a single body and made in a single piece.

According to an embodiment, said driving element 20 comprises a central driving element body 48 adapted to rest against said braking band 2 and said bell 13 in tangential direction T-T.

According to an embodiment, said middle driving element body 48 comprises a driving element opening 49 which allows said driving element 20 to be elastically deformed in the tangential direction T-T of said driving element 20, if biased, thus obtaining the benefits of the gasket effect in case of vibrations of the disc, which reduces knocks and noises and ensures constant sealing and friction on sliding surfaces between driving element 20 and braking band 2 and bell 13, thus always ensuring an expansion of the band under the optimal conditions set forth in the design.

According to an embodiment, said driving element 20 comprises two opposite resting flanges 50, 51 for resting and preloading in axial direction A-A the driving element on the braking band 2 on one side, and on the bell 13 on the other.

According to an embodiment, each of said resting flanges 50, 51 connects to a central driving element body 48 by means of driving element reliefs 52 adapted to avoid the notching effect and contact with braking band 2 and bell 13.

According to an embodiment, the tangential driving between said braking band 2 and said bell 13 only occurs by means of said driving element 20, thus avoiding a direct contact in tangential T-T or circumferential C-C direction between said braking band 2 and said bell 13.

According to an embodiment, said radial band connecting extension or first radial band connecting extension 6 and said opposite second radial band connecting extension 40, and said radial bell connecting extension or first radial bell connecting extension 15 and said second radial bell connecting extension 46 and/or said third radial band connecting extension 41 and said opposite fourth radial band connecting extension 42 allow to guide said braking band 2 in both forward and reverse directions of the vehicle.

According to an embodiment, said braking band 2 is made of a different material than the material of said bell 13.

According to an embodiment, said braking band 2 is made of cast iron.

According to an embodiment, said braking band 2 is made of titanium and/or alloys thereof.

According to an embodiment, said braking band 2 is made of a titanium alloy.

According to an embodiment, said bell 13 is made of aluminum and/or alloys thereof.

According to an embodiment, said bell 13 is made of steel.

According to an embodiment, said driving element 20 is made of steel.

According to an embodiment, said driving element 20 is made of titanium and/or alloys thereof.

Advantageously, the use of titanium offers particular advantages. Indeed, titanium displays low density, high strength comparable to steel and twice more than aluminum, low modulus of elasticity, low thermal conductivity, low thermal expansion, excellent corrosion resistance, easy processing, biocompatibility, it is not magnetic and can withstand extreme temperatures due to its high melting point.

According to an embodiment, said bell connecting element 45 comprises bell chamfers or slides 53 adapted to allow the movement of said driving element 20 so that the driving element can rest on said bell connecting element 45 and constrain said braking band 2 to said bell 13.

According to an embodiment, said bell chamfers or slides 53 are included in said at least one radial bell connecting extension 15; 46 to allow the forced sliding of the driving element 20 and the sandwiching of the bell 13 against the braking band 2.

According to an embodiment, said driving element 20 comprises driving element chamfers or slides 54 adapted to allow the movement/sliding of said driving element 20 so that the driving element can slide and rest on said bell connecting element 45 and constrain said braking band 2 to said bell 13.

The present invention further relates to an assembly method of a brake disc.

This method for connecting a braking band 2 to a bell 13 provides the steps of:
providing an assembly 1 as described in any one of the preceding claims;
resting said driving element 20 on said bell 13 in a position which allows the free coupling of said bell 13 to the braking band 2;
resting said bell 13 on said braking band 2;
moving said driving element 20 by passing:
from a position in which said driving element 20 avoids resting on the braking band 2;
to a position in which said driving element 20 rests on the braking band 2 and constrains said braking band 2 to said bell 13 in axial direction A-A and in circumferential direction C-C;
thus avoiding said braking band 2 from being constrained to said bell 13 in radial direction R-R.

Advantageously, the further steps are provided of:
providing a band edge 36 in said band 2 which forms an outer radial abutment band seat 37 which prevents a movement in radial direction R-R of said driving element 20;
providing in said at least one driving element 20 at least one radial driving element extension 35 having a coupling tooth 38;
at least partially and removably inserting said coupling tooth 38 into said outer radial abutment band seat 37.

The person skilled in the art may make many changes and adaptations to the embodiments described above or may replace elements with others which are functionally equivalent in order to satisfy contingent needs without however departing from the scope of the appended claims.

LIST OF REFERENCE SYMBOLS

1 disc assembly of disc brake, or disc brake disc assembly
2 braking band
3 opposite braking surfaces
4 opposite braking surfaces
5 radially inner braking band edge
6 radial band connecting extension, or first radial band connecting extension
7 first bell resting surface
8 second bell resting surface arranged on the same plane as said first bell resting surface
9 first driving band surface
10 second band driving surface arranged on the same plane as said first band driving surface
11 third band driving surface opposite to said first band driving surface
12 fourth band driving surface arranged on the same plane as said third band driving surface
13 bell
14 stub axle connecting elements
15 radial bell connecting extension, or first radial bell connecting extension
16 first band resting surface
17 second band resting surface arranged on the same plane as said first band resting surface
18 first bell driving surface arranged on the same plane as said first bell driving surface
19 second bell driving surface arranged on the same plane as said third band driving surface
20 driving element
21 band driving element first axial resting surface
22 further first axial resting surface arranged on the same plane as said driving element first axial resting surface
23 second driving element axial resting surface for said bell arranged opposite to said driving element first axial resting surface for said belt
24 further second axial resting surface arranged on the same plane as said driving element second axial resting surface
25 first tangential bell driving surface
26 second tangential bell driving surface
27 first tangential driving band surface
28 second tangential band driving surface arranged on the same plane as said first tangential band driving surface
29 third tangential band driving surface arranged opposite to said first tangential band driving surface
30 fourth tangential band driving surface arranged on the same plane as said third tangential band driving surface
31 first opposite band axial surface
32 second opposite band axial surface arranged on the same plane as said first opposite band axial surface
33 first opposite bell axial surface
34 second opposite bell axial surface arranged on the same plane as said first opposite bell axial surface
35 driving element radial extension
36 bell edge
37 outer radial abutment band seat
38 coupling tooth
39 band connection element
40 second radial band connecting extension
41 third radial band connecting extension
42 fourth radial band connecting extension
43 band connecting element circumferential channel
44 band radial-axial window
45 bell connecting element
46 second radial bell connecting extension
47 bell radial-axial window
48 driving element central body
49 driving element opening
50 driving element resting flange
51 driving element resting flange
52 driving element reliefs
53 bell chamfers or slides
54 driving element chamfers or slides
55 radially outer braking band edge
56 inner connecting edge inner braking band slanted surfaces
57 outer connecting edge outer braking band slanted surface 58 band plates
59 band plates
60 ventilation channel
61 band plate connecting elements
62 braking band groove
63 groove module
64 second braking band groove
65 closed groove edge
66 straight groove stretch
67 slanted straight groove stretch
68 groove bottom
69 groove holes
70 circular section ventilation channel opening
71 elliptical section ventilation channel opening
72 outer edge radial recesses
73 band circumferential channel
74 bell circumferential channel
75 radial bell connecting extension
76 radial bell connecting extension
A-A axial direction
R-R radial direction
T-T tangential direction
C-C circumferential direction
X-X brake assembly rotation axis

The invention claimed is:

1. A disc assembly of disc brake configured to cooperate with a brake caliper to apply a braking action on a vehicle, said disc assembly being configured to rotate about a rotation axis (X-X) either coincident with or parallel to an axial direction (A-A), said disc assembly extending away from said rotation axis along radial directions (R-R) orthogonal to said axial direction (A-A) and along circumferential directions (C-C) orthogonal to said axial direction (A-A) and to said radial directions (R-R), and locally defining tangential directions (T-T) orthogonal to said axial direction (A-A) and orthogonal to the radial direction (R-R) passing through said point;
wherein said disc assembly comprises:
a braking band;
a bell for connecting the disc assembly to a support of the vehicle; and
at least one driving element;
wherein
said bell comprises at least one driving bell surface which extends in a plane comprising said axial (A-A) and radial (R-R) directions, forming a tangential abutment surface for the bell;
wherein
said bell rests on at least one bell resting surface of the braking band, or on a plurality of bell resting surfaces of the braking band coplanar with one another, avoiding a bilateral constraint at least between said bell and said braking band;
said braking band comprises at least one driving band surface which extends in a plane comprising said axial (A-A) and radial (R-R) directions, forming at least one tangential abutment surface for the braking band;
said at least one driving element slidingly rests on said at least one driving bell surface;
said at least one driving element is selectively movable along said at least one driving bell surface, passing at least:
from a position in which said at least one driving element avoids resting on the braking band
to a position in which said at least one driving element rests on the braking band and constrains said braking band to said bell in axial direction (A-A) and in circumferential direction (C-C),
preventing said braking band from being constrained to said bell in radial direction,
wherein
said braking band comprises a band edge that forms an outer radial abutment band seat which prevents a movement in radial direction (R-R) of said at least one driving element; and wherein
said at least one driving element comprises at least one radial driving element extension; and wherein
said radial driving element extension comprises a coupling tooth which is at least partially and removably inserted into said outer radial abutment band seat.

2. The disc assembly of claim 1, wherein:
said braking band comprises a plurality of band connecting elements;
each band connecting element comprises
said radial band connecting extension, or first radial band connecting extension,
a second radial band connecting extension,
a third radial band connecting extension, and
a fourth radial band connecting extension,
wherein
said first, second, third and fourth radial band connecting extensions surround said at least one driving element for each band connecting element of said plurality of band connecting elements, creating bilateral constraints in tangential direction (T-T).

3. The disc assembly of claim 2, wherein each band connecting element comprises four radial band connecting extensions opposed in pairs and separated by a circumferential channel of band connecting element and a radial axial band window configured to slidingly accommodate said at least one driving element.

4. The disc assembly of claim 2, wherein said band connecting element comprises a channel extending in radial (R-R) and axial (A-A) directions between radial band extension portions thereof, which allows said band connecting element to be elastically deformed in the tangential direction (T-T) of said band connecting element, if biased.

5. The disc assembly of claim 2, wherein said band connecting element comprises a channel extending in radial (R-R) and circumferential (C-C) directions between radial band extension portions thereof, which allows said band connecting element to be elastically deformed in the axial direction (A-A) of said band connecting element, if biased.

6. The disc assembly of claim 2, wherein said radial band connecting extension or first radial band connecting extension and opposite second radial band connecting extension, and said radial bell connecting extension or first radial bell connecting extension and second radial bell connecting extension and/or said third radial band connecting extension and opposite fourth radial band connecting extension, allow guiding said braking band in both forward and reverse directions of the vehicle.

7. The disc assembly of claim 1, wherein:
said braking band comprises at least one radial band connecting extension which protrudes in radial direction (R-R) towards said rotation axis (X-X); and wherein
said at least one radial band connecting extension comprises a first bell resting surface and a second bell resting surface which extend in a plane comprising said circumferential (C-C) and radial (R-R) directions, forming an axial abutment surface for a bell.

8. The disc assembly of claim 7, wherein:
said at least one radial band connecting extension comprises at least one driving band surface which extends in a plane comprising said axial (A-A) and radial (R-R) directions, forming a tangential abutment surface for the braking band; and wherein
said at least one radial band connecting extension comprises a first opposite axial band surface and a second opposite axial band surface which extend along said circumferential (C-C) and radial (R-R) directions, forming an axial abutment surface.

9. The disc assembly of claim 8, wherein said first opposite axial band surface and said second opposite axial band surface arranged on a same plane as said first opposite axial band surface and said first bell-resting surface and said second bell resting surface arranged on the same plane as said first bell resting surface are present on portions of the radial band connecting extensions which are separated from one another by at least one circumferential band channel which allows elastic deformation of the band connecting element, allowing a preloaded coupling to the at least one driving element, obtaining benefits of a gasket effect in case of vibrations of the disc, which reduces knocks and noises and ensures constant sealing and friction on sliding surfaces between driving element and braking band and bell, always ensuring an expansion of the braking band under optimal conditions set forth in design.

10. The disc assembly of claim 1, wherein:
said bell comprises a plurality of bell connecting elements;
each bell connecting element comprising
a radial bell connecting extension, or first radial bell connecting extension, and
a second radial bell connecting extension,
wherein
said first and second radial bell connecting extensions for each bell connecting element surround said at least one driving element, creating bilateral constraints in tangential direction (T-T);
and/or wherein
each bell connecting element has two opposed radial bell connecting extensions separated by a radial-axial bell window configured to slidingly accommodate said at least one driving element.

11. The disc assembly of claim 10, wherein:
said bell connecting element comprises bell chamfers or slides configured to allow movement of said at least one driving element so that the at least one driving element rests on said bell connecting element and constrains said braking band to said bell;
and wherein
said bell chamfers or slides are included in said at least one radial bell connecting extension to allow forced sliding of the at least one driving element and sandwiching of the bell against the braking band;
and wherein
said at least one driving element comprises driving element chamfers or slides configured to allow movement/sliding of said at least one driving element so that the at least one driving element slides and rests on said bell connecting element and constrains said braking band to said bell.

12. The disc assembly of claim 1, wherein:
said braking band comprises at least one radial band connecting extension which protrudes in radial direction (R-R) towards said rotation axis (X-X);
said at least one radial band connecting extension comprising at least one bell resting surface which extends along said circumferential (C-C) and radial (R-R) directions, forming an axial abutment surface for a bell;
said at least one radial band connecting extension comprises at least one driving band surface which extends along said axial (A-A) and radial (R-R) directions, forming a tangential abutment surface for the braking band; and
said at least one radial band connecting extension comprises at least a first opposite axial band surface which extends along said circumferential (C-C) and radial (R-R) directions, forming an axial abutment surface.

13. The disc assembly of claim 12, wherein:
said at least one bell resting surface consists of two bell resting surfaces;
said two bell resting surfaces are coplanar and facing a same side of the braking band; and
said two bell resting surfaces are formed on two adjacent but separate radial band connecting extensions;
and/or wherein
said at least one driving band surface are four driving band surfaces;
said four driving band surfaces are coplanar in pairs and opposite in pairs, forming resting and sliding guides for said at least one driving element; and
said four driving band surfaces are formed in four adjacent but separate radial band connecting extensions.

14. The disc assembly of claim 1, wherein:
said at least one driving element is a single body and made in a single piece;
and wherein
said at least one driving element comprises a central driving element body configured to rest against said braking band and said bell in tangential direction (T-T).

15. The disc assembly of claim 14, wherein:
said central driving element body comprises a driving element opening which allows said at least one driving element to be elastically deformed in the tangential direction (T-T) of said at least one driving element, if biased, obtaining benefits of a gasket effect in case of vibrations of the disc, which reduces knocks and noises and ensures constant sealing and friction on sliding surfaces between driving element and braking band and bell, always ensuring an expansion of the braking band under optimal conditions set forth in design;
and wherein
said at least one driving element comprises two opposite resting flanges for resting and preloading in axial direction (A-A) the at least one driving element on the braking band on one side, and on the bell on the other side;
and wherein
each of said resting flanges connects to a central driving element body by driving element reliefs configured to avoid notching effect and contact with the braking band and the bell.

16. The disc assembly of claim 1, wherein said braking band comprises opposite braking surfaces configured to cooperate with brake pads to apply said braking action.

17. The disc assembly of claim 1, wherein:
a first band resting surface and a second band resting surface arranged on a same plane as said first band resting surface and
a first opposite axial bell surface and a second opposite axial bell surface arranged on a same plane as said first opposite axial bell surface are present on portions of radial bell connecting extensions which are separated from one another by at least one circumferential bell channel which allows elastic deformation of a bell connecting element, allowing a preloaded coupling to the at least one driving element, obtaining benefits of a gasket effect in case of vibrations of the disc, which reduces knocks and noises and ensures constant sealing and friction on sliding surfaces between driving element and braking band and bell, always ensuring an expansion of the braking band and/or bell under optimal conditions set forth in design.

18. The disc assembly of claim 1, wherein:
said bell comprises at least one radial bell connecting extension which protrudes in radial direction (R-R) away from said rotation axis (A-A);
said at least one radial bell connecting extension comprises at least one band resting surface which extends along said circumferential (C-C) and radial (R-R) directions, forming an axial abutment surface for said braking band;
said at least one radial bell connecting extension comprises at least one driving bell surface which extends along said axial (A-A) and radial (R-R) directions, forming a tangential abutment surface for the bell;
said at least one radial bell connecting extension comprises at least one first opposite axial bell surface which extends along said circumferential (C-C) and radial (R-R) directions, forming an axial abutment surface.

19. The disc assembly of claim 1, wherein:
said at least one driving bell surface consists of two driving bell surfaces, which are opposed to form a bilateral guide for said at least one driving element; and
said two driving bell surfaces are formed in two separate radial bell connecting extensions.

20. The disc assembly of claim 1, wherein tangential driving between said braking band and said bell only occurs by said at least one driving element, avoiding a direct contact in tangential (T-T) or circumferential (C-C) direction between said braking band and said bell.

21. The disc assembly of claim 1, wherein:
said braking band is made of a material different from the material of said bell;
wherein
said braking band is made of iron, or titanium, or a titanium alloy;
and wherein
said bell is made of aluminum or steel;
and wherein
said at least one driving element is made of steel or titanium.

22. A method for connecting a braking band to a bell, said method comprising:
providing a disc assembly of disc brake configured to cooperate with a brake caliper to apply a braking action on a vehicle, said disc assembly being configured to rotate about a rotation axis (X-X) either coincident with or parallel to an axial direction (A-A), said disc assembly extending away from said rotation axis along radial directions (R-R) orthogonal to said axial direction (A-A) and along circumferential directions (C-C) orthogonal to said axial direction (A-A) and to said radial directions (R-R), and locally defining tangential directions (T-T) orthogonal to said axial direction (A-A) and orthogonal to the radial direction (R-R) passing through said point;

wherein said disc assembly comprises:
a braking band;
a bell for connecting the disc assembly to a support of the vehicle; and
at least one driving element;
wherein
said bell comprises at least one driving bell surface which extends in a plane comprising said axial (A-A) and radial (R-R) directions, forming a tangential abutment surface for the bell;
wherein
said bell rests on at least one bell resting surface of the braking band, or on a plurality of bell resting surfaces of the braking band coplanar with one another, avoiding a bilateral constraint at least between said bell and said braking band;
said braking band comprises at least one driving band surface which extends in a plane comprising said axial (A-A) and radial (R-R) directions, forming at least one tangential abutment surface for the braking band;
said at least one driving element slidingly rests on said at least one driving bell surface;
said at least one driving element is selectively movable along said at least one driving bell surface, passing at least:
from a position in which said at least one driving element avoids resting on the braking band
to a position in which said at least one driving element rests on the braking band and constrains said braking band to said bell in axial direction (A-A) and in circumferential direction (C-C);
preventing said braking band from being constrained to said bell in radial direction,
wherein
said braking band comprises a band edge that forms an outer radial abutment band seat which prevents a movement in radial direction (R-R) of said at least one driving element; and wherein
said at least one driving element comprises at least one radial driving element extension; and wherein
said radial driving element extension comprises a coupling tooth which is at least partially and removably inserted into said outer radial abutment band seat;
resting said at least one driving element on said bell in a position which allows free coupling of said bell to the braking band;
resting said bell on said braking band;
moving said at least one driving element
from a position in which said at least one driving element avoids resting on the braking band
to a position in which said at least one driving element rests on the braking band and constrains said braking band to said bell in axial direction (A-A) and in circumferential direction (C-C);
preventing said braking band from being constrained to said bell in radial direction (R-R);
the method further comprising:
providing a band edge in said braking band, said band edge forming an outer radial abutment band seat which prevents a displacement of said at least one driving element in radial direction (R-R);

providing in said at least one driving element at least one radial driving element extension having a coupling tooth; and at least partially and removably inserting said coupling tooth into said outer radial abutment band seat.

\* \* \* \* \*